United States Patent
Coriale et al.

(10) Patent No.: US 6,252,618 B1
(45) Date of Patent: Jun. 26, 2001

(54) METHOD OF CONTROLLING PRINT REGISTRATION IN AN ELECTROPHOTOGRAPHIC MACHINE

(75) Inventors: Matthew Christopher Coriale; Gregory Lawrence Ream; John Parker Richey, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/594,449

(22) Filed: Jun. 15, 2000

(51) Int. Cl.[7] .............................. B41J 2/385; G01D 15/06; G03G 15/01

(52) U.S. Cl. ......................... 347/116; 347/134; 347/250; 347/261

(58) Field of Search .................................... 347/116, 115, 347/129, 134, 139, 153, 154, 232, 250, 261, 260

(56) References Cited

U.S. PATENT DOCUMENTS

| | | |
|---|---|---|
| 4,130,838 | 12/1978 | St. John . |
| 4,140,903 | 2/1979 | Clark . |
| 4,845,358 | 7/1989 | Asada . |
| 4,922,266 | 5/1990 | Bidner et al. . |
| 4,931,815 | 6/1990 | Sato et al. . |
| 4,942,406 * | 7/1990 | Tsuda ................................. 347/260 |
| 4,951,065 | 8/1990 | Okino . |
| 4,975,626 | 12/1990 | Yagi et al. . |
| 5,054,866 | 10/1991 | Tomita et al. . |
| 5,105,208 | 4/1992 | Matsuoka et al. . |
| 5,121,138 | 6/1992 | Schermer et al. . |
| 5,181,137 | 1/1993 | Koide . |
| 5,212,570 | 5/1993 | Nacman . |
| 5,245,637 | 9/1993 | Gersbach et al. . |
| 5,260,811 | 11/1993 | Morikawa . |
| 5,264,872 * | 11/1993 | Wong ................................. 347/250 |

(List continued on next page.)

Primary Examiner—Susan S. Y. Lee
(74) Attorney, Agent, or Firm—Taylor & Aust, P.C.

(57) ABSTRACT

A method of aligning print images of an electrophotographic machine on a print medium includes providing a plurality of rotating photoconductive drums in the electrophotographic machine. Each of a plurality of laser beams is reflected off of a respective one of a plurality of reflectors. Each reflector rotates relative to the respective laser beam to thereby scan the laser beam across a respective one of the photoconductive drums to produce a scan line in a scan direction. The relative rotation between the laser beams and the respective reflectors is cyclically repeated to thereby produce a plurality of substantially parallel scan lines on each photoconductive drum. Each scan line is displaced from an adjacent scan line by a scan line separation distance in a process direction perpendicular to the scan direction. Toner is applied to each scan line on the photoconductive drums. A moving toner transfer medium contacts each photoconductive drum at a respective toner transfer nip. A first toner transfer nip is associated with a first reflector. A second toner transfer nip is associated with a second reflector. A length of the toner transfer medium between at least the first toner transfer nip and the second toner transfer nip is a non-integer multiple of the scan line separation distance. The length of the toner transfer medium has an integer portion and a fractional portion when expressed in units of the scan line separation distance. A speed of the rotation of the second reflector is temporarily increased or decreased dependent upon the fractional portion of the length. The toner is transferred from the photoconductive drums to the toner transfer medium. The toner is transferred from the toner transfer medium to the print medium. The machine controller provides raster image data to the respective laser printheads after accounting for the relative phase relationships between the respective reflectors. Raster scan data is synchronized in both scan and process directions to produce scans on the transfer medium that overlay those deposited at an earlier photoconductive drum.

32 Claims, 6 Drawing Sheets

U.S. PATENT DOCUMENTS

| | | |
|---|---|---|
| 5,331,341 | 7/1994 | Egawa et al. . |
| 5,331,342 | 7/1994 | Shimatani et al. . |
| 5,349,374 | 9/1994 | Arai et al. . |
| 5,424,763 | 6/1995 | Komiya et al. . |
| 5,448,267 | 9/1995 | Sugiura et al. . |
| 5,471,314 | 11/1995 | Orlicki et al. . |
| 5,477,330 | 12/1995 | Dorr . |
| 5,541,637 | 7/1996 | Ohashi et al. . |
| 5,550,573 | 8/1996 | Serizawa et al. . |
| 5,671,069 | 9/1997 | Kodama . |
| 5,710,751 | 1/1998 | Hoover et al. . |
| 5,764,270 | 6/1998 | Kitigawa et al. . |
| 5,818,507 | 10/1998 | Genovese . |
| 5,821,977 | 10/1998 | Nishimura . |
| 5,877,798 | 3/1999 | Clarke et al. . |
| 5,883,659 | 3/1999 | Serizawa et al. . |
| 5,933,184 | 8/1999 | Ishigami et al. . |
| 5,982,408 | 11/1999 | Overall et al. . |
| 6,052,143 | 4/2000 | Yoshino et al. . |
| 6,094,208 | 7/2000 | Oda et al. . |

\* cited by examiner

METHOD OF CONTROLLING PRINT REGISTRATION IN AN ELECTROPHOTOGRAPHIC MACHINE

BACKGROUND OF THE INVENTION

1. Field of the Invention

The present invention relates to an electrophotographic machine, and, more particularly, to a method of controlling print registration in an electrophotographic machine.

2. Description of the Related Art

In an in-line color laser image printing process, the print medium typically passes through four color developing stations in series, with the colors being black, magenta, cyan and yellow. In order for the multi-color laser printer to print at the same speed as a monochrome laser printer, photoconductive drum exposures must occur for all four colors in parallel, shifted in time. Thus, alignment of the four color developing stations in both the process direction (feed direction of the print medium) and scan direction (across the page) is critical.

The process location of each scanning laser beam must overlap in order to prevent color offset in the process direction. Each color must have an adjustment to correct for process direction misalignment because each color has a scanning laser beam following a separate optical path. A particular problem in aligning the outputs of the laser beams in the process direction is that a length of the toner transfer belt between two points at which the belt contacts two respective photoconductive drums is often not an integer multiple of the distance between adjacent scan lines on the photoconductive drums. Consequently, after a scan line is transferred from a first photoconductive drum to the transfer belt, and that point on the transfer belt is advanced to a second photoconductive drum, the scan line on the transfer belt from the first photoconductive drum does not align in the process direction with a scan line to be transferred from the second photoconductive drum.

What is needed in the art is a method of aligning scan lines of multiple photoconductive drums in a process direction which takes into account the possibility that the length of the transfer belt between at least two of the photoconductive drums may not be an integer multiple of the distance between consecutive scan lines in the process direction.

SUMMARY OF THE INVENTION

The present invention provides a method of aligning images in the process direction for a color electrophotographic printer while maintaining a minimal interpage gap.

The invention comprises, in one form thereof, a method of aligning print images of an electrophotographic machine on a print medium or intermediate transfer belt. A plurality of rotating photoconductive drums are provided in the electrophotographic machine. Each of a plurality of laser beams is reflected off of a respective one of a plurality of reflectors. Each reflector rotates relative to the respective laser beam to thereby scan the laser beam across a respective one of the photoconductive drums to produce a scan line in a scan direction. The relative rotation between the laser beams and the respective reflectors is cyclically repeated to thereby produce a plurality of substantially parallel scan lines on each photoconductive drum. Each scan line is displaced from an adjacent scan line by a scan line separation distance in a process direction perpendicular to the scan direction. Toner is applied to each scan line on the photoconductive drums. A moving toner transfer medium contacts each photoconductive drum at a respective toner transfer nip. A first toner transfer nip is associated with a first reflector. A second toner transfer nip is associated with a second reflector. A length of the toner transfer medium between at least the first toner transfer nip and the second toner transfer nip may be a non-integer multiple of the scan line separation distance. The length of the toner transfer medium has an integer portion and a fractional portion when expressed in units of the scan line separation distance. If the fractional portion is not zero, a speed of the rotation of the second reflector is temporarily increased or decreased dependent upon the fractional portion of the length to produce a compensating phase relationship between the respective reflectors. The toner is transferred from the photoconductive drums to the toner transfer medium. The toner is transferred from the toner transfer medium to the print medium.

An advantage of the present invention is that the laser beams of a multicolor electrophotographic machine can be aligned in the process direction in real time while the machine is operating. The machine microcontroller is capable of providing raster scan data synchronized to the rotating reflectors in both scan and process directions.

Another advantage is that the length of the gap between a trailing edge of one page of print medium and the leading edge of the next page can be minimized, thereby increasing the output speed of the electrophotographic machine.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
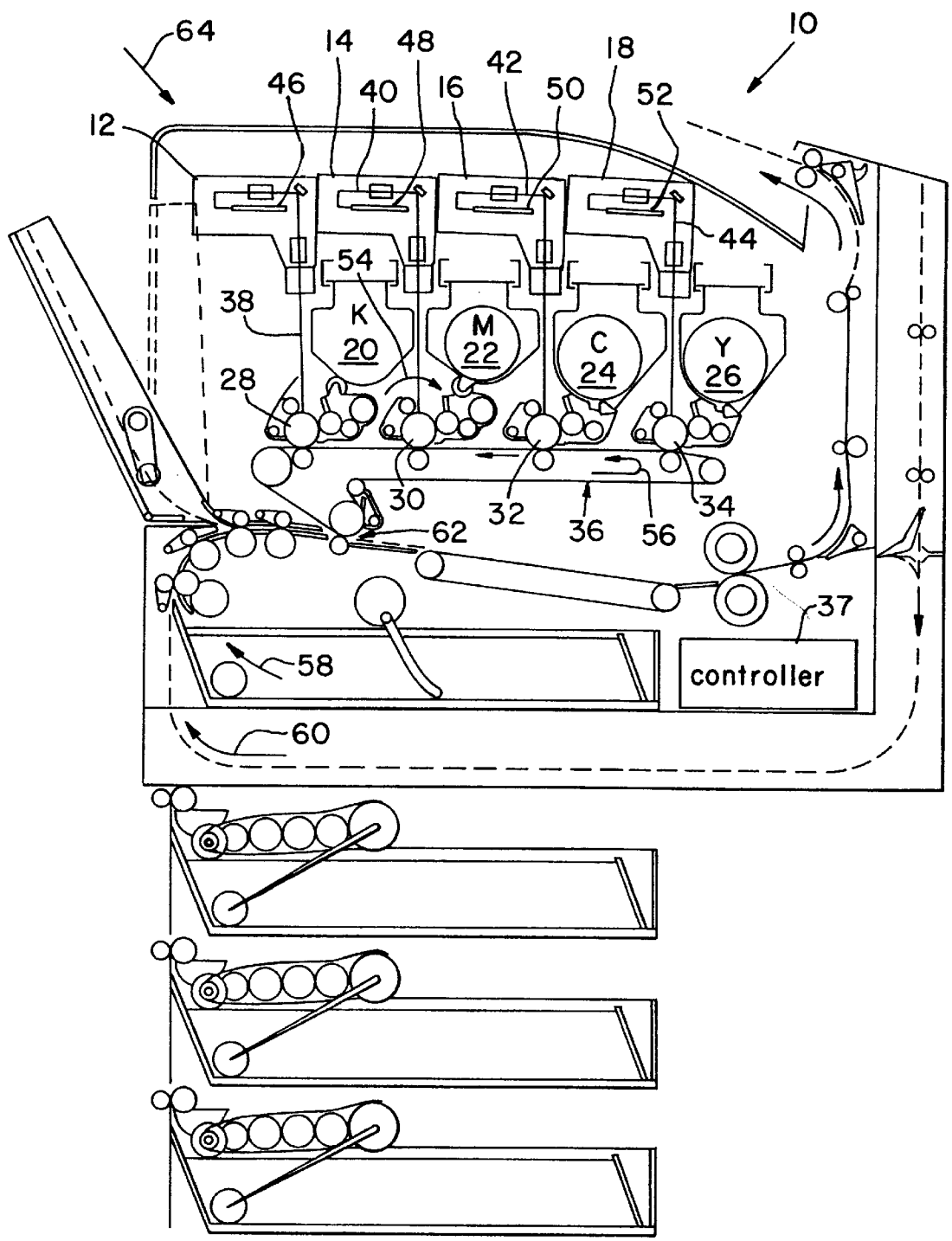
FIG. 1 is a side, sectional view of one embodiment of a multicolor laser printer in which the method of the present invention may be used.

Referring now to the drawings and, more particularly, to FIG. 1, there is shown one embodiment of a multicolor laser printer 10 including laser print heads 12, 14, 16, 18, a black toner cartridge 20, a magenta toner cartridge 22, a cyan toner cartridge 24, a yellow toner cartridge 26, photoconductive drums 28, 30, 32, 34, an intermediate transfer member belt 36 and a controller 37. The controller is a combination of Application Specific Integrated Circuits (ASIC's), microprocessors, and firmware suited to the tasks described.

Each of laser print heads 12, 14, 16 and 18 projects a respective laser beam 38, 40, 42, 44 off of a respective one of polygon mirrors 46, 48, 50 and 52. As each of polygon mirrors 46, 48, 50 and 52 rotates, it scans a respective one of reflected laser beams 38, 40, 42 and 44 in a scan direction, perpendicular to the plane of FIG. 1, across a respective one of photoconductive drums 28, 30, 32 and 34. Each of photoconductive drums 28, 30, 32 and 34 is negatively charged to approximately −1000 volts and is subsequently discharged to a level of approximately −300 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 54. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is transported upon the surface of a developer roll biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −300 volts by the laser beams. As belt 36 rotates in the direction indicated by arrow 56, the toner from each of drums 28, 30, 32 and 34 is transferred to the outside surface of belt 36. As a print medium, such as paper, travels along either path 58 or duplexing path 60, the toner is transferred to the surface of the print medium in nip 62.

Figure 2A:
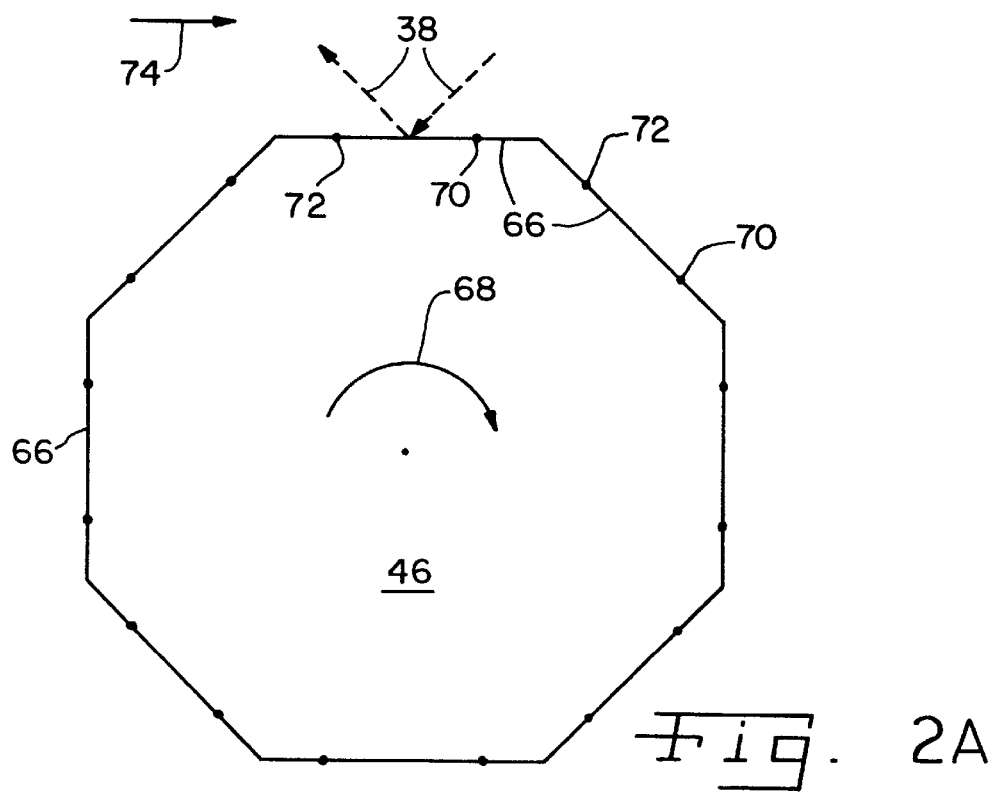
FIG. 2a is a cross-sectional view of one of the polygon mirrors of FIG. 1 reflecting a laser beam.

One embodiment of a polygon mirror 46 is shown in FIG. 2a as viewed in the direction of arrow 64 in FIG. 1. Polygon mirror 46 is shaped as an octagon with eight reflective sides or facets 66. As polygon mirror 46 rotates in the direction indicated by arrow 68, laser beam 38 reflects off of facets 66 between points 70 and 72 toward photoconductive drum 28. Thus, as polygon mirror 46 rotates in direction 68, the reflected laser beam 38 is caused to scan across the peripheral surface of photoconductive drum 28 in scan direction 74.

Figure 3:
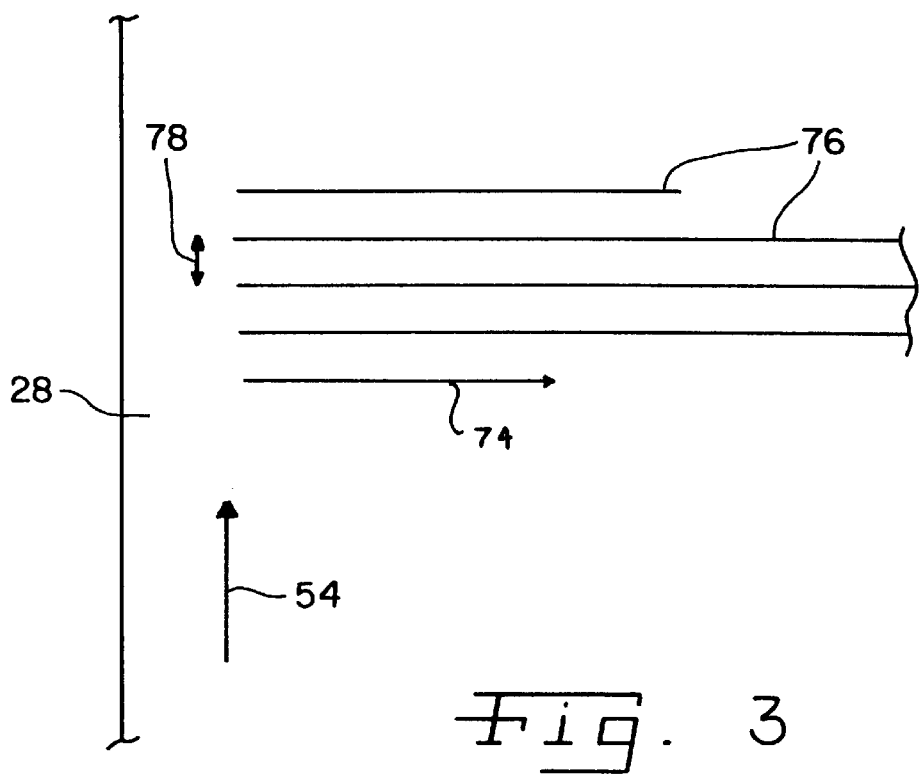
FIG. 3 is a fragmentary, top view of one of the photoconductive drums of FIG. 1.

Laser beam 38 produces a respective one of scan lines 76 (FIG. 3) each time that mirror 46 rotates such that laser beam 38 is reflected continuously between points 70 and 72 on one of facets 66. The top scan line 76 of FIG. 3 is shown in an uncompleted state, as it would be with laser beam 38 reflecting off of one of facets 66 at a point approximately midway between points 70 and 72, as shown in FIG. 2a. The reflection of laser beam 38 off of polygon mirror 46 is temporarily interrupted in the time period after laser beam reaches point 72 and before polygon mirror 46 has rotated to a point at which laser beam 38 can reflect off of point 70 on the next succeeding facet 66. Once outside the image area that corresponds to the scan generated between points 70 and 72, the laser beam is temporarily enabled to produce start of scan, end of scan, or both, synchronization signals as the laser beam strikes sensors positioned outside the image area. The pulse generated when the laser beam strikes the synchronization sensor is termed HSYNC. Due to the continual rotation of photoconductive drum 28 in process direction 54, the scan lines 76 associated with adjacent facets 66 are displaced from one another by a constant scan line separation distance 78 in process direction 54. The length of scan line separation distance 78 relative to the width of each individual scan line 76 is greatly exaggerated in FIG. 3 for purposes of clarity of illustration.

A different image is scanned on each of photoconductive drums 28, 30, 32 and 34, with each image depending on what combination of black, magenta, cyan and yellow toner is to be deposited at each corresponding location on the print medium. In order to maintain proper registration, the images must be properly aligned in both process direction 54 and scan direction 74.

Figure 4:
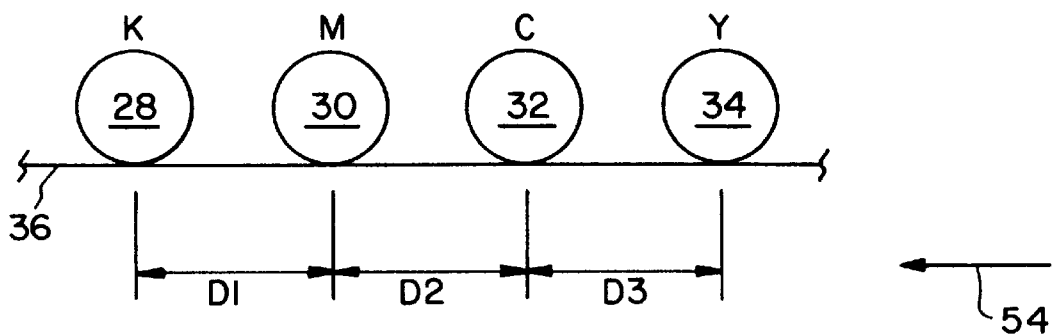
FIG. 4 is a fragmentary, schematic side view of the toner transfer belt and photoconductive drums of FIG. 1.

In general, the length of toner transfer belt 36 between the photoconductive drums is not an integer multiple of scan line separation distance 78. Distances D1, D2 and D3 (FIG. 4) are the lengths of toner transfer belt 36 between the nips at which toner is transferred from the photoconductive drums to belt 36.

Controller 37 receives a horizontal synchronization signal (HSYNC) from each of laser print heads 12, 14, 16 and 18 when the corresponding one of laser beams 38, 40, 42 and 44 begins to impinge on the corresponding printhead synchronization sensor. With continued rotation of the printhead polygon, the laser beam then scans the corresponding photoconductive drums 28, 30, 32 and 34. Besides indicating the beginning of light impinging on the photoconductive drums, the HSYNC signals can also be used to align images in process direction 54 if the HSYNC signals are properly staggered in time. The method of the present invention adjusts the relative phase of the printhead polygons to produce the appropriate time relationship among the HSYNC signals to compensate for the fact that the lengths of toner transfer belt 36 between photoconductive drums 28, 30, 32 and 34 are not integer multiples of scan line separation distance 78.

As an illustrative example, assume that, when the HSYNC signals corresponding to each of the four toner colors are perfectly aligned, i.e., the falling edges of the HSYNC signals are coincident, the value of D1 is 2000.3 times as great as scan line separation distance 78 (D1 is 2000.3 scans). Further assume that D2 is 2001.5 scans and D3 is 1999.6 scans. In addition, assume that a 1000 scan line interpage gap is used between consecutive pages of the print medium. The interpage gap is the distance between the end of one page and the beginning of the next. The interpage gap must be minimized in order for printer 10 to maintain maximum throughput.

Figure 2B:
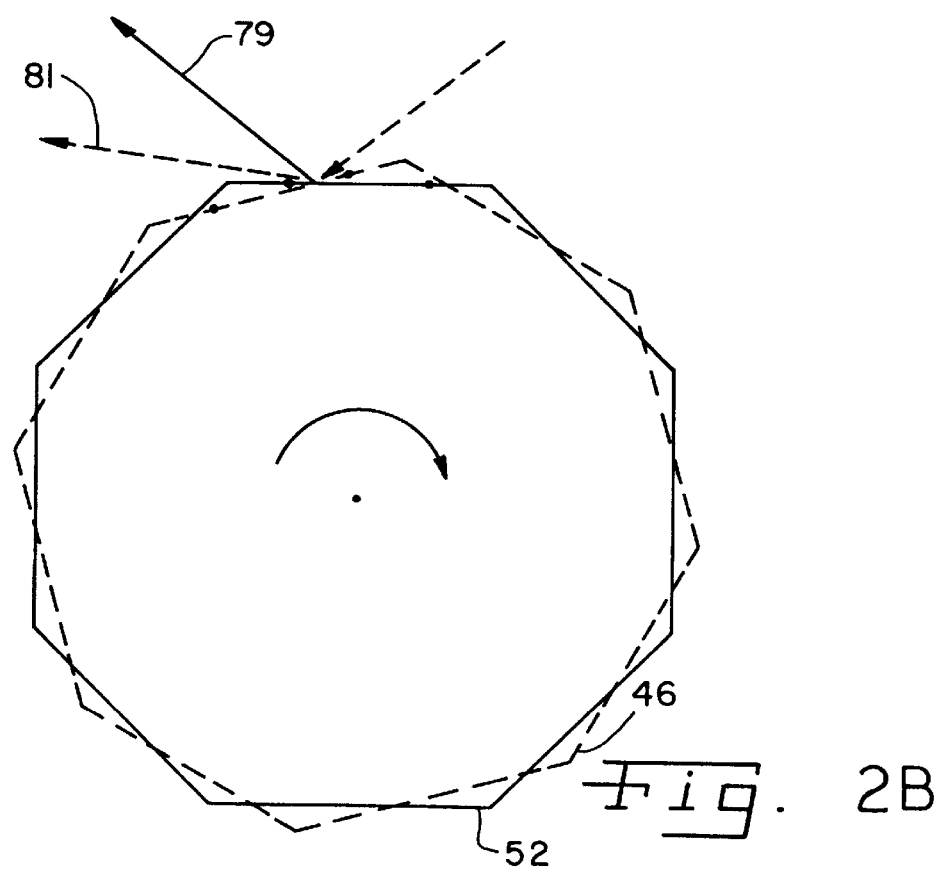
FIG. 2b is a cross-sectional, superimposed view of two of the polygon mirrors of FIG. 1 reflecting respective laser beams.

In order to align the yellow scan lines to the black scan lines, based on the above assumptions, the HSYNCYn must be spaced from HSYNCKn by FRAC(6002−(2000.3+2001.5+1999.6)=FRAC(6002−6001.4)=0.6 scan periods, i.e., the time required for toner transfer belt 36 to traverse 60% of scan line separation distance 78. Here, FRAC is defined as an operation that yields the fractional part of a real number. This means that using HSYNCKn as a reference, the Y plane must begin imaging 6001 scan lines before imaging begins for the K plane, which results in a 6002 scan line separation. A comparison of the rotational positions of polygon mirrors 46 and 52 at a particular point in time with HSYNCYn spaced from HSYNCKn by approximately 0.6 scan periods is shown in FIG. 2b. The rotational position of polygon mirror 52 is indicated by solid lines, while the position of polygon mirror 46 is indicated by dashed lines.

The rotational position of polygon mirror 52 is offset from the rotational position of polygon mirror 46 by 60% of one-eighth of a full rotation of an eight-sided polygon mirror. That is, mirrors 46 and 52 are offset from one another by 3/40 (0.075) of a full rotation of a polygon mirror. Further, the position of laser beam 44 after being reflected off of mirror 52 is indicated by arrow 79, while the position of laser beam 38 after being reflected off of mirror 46 is indicated by arrow 81. Using this method, the first scan line of K will fall exactly on the first scan line of Y, i.e., the first scan line of K will be aligned with the first scan line of Y in process direction 54.

Similarly, it is possible to determine the number of scans that M and C must be started before K is imaged in order to align colors in process direction 54.

For C: FRAC(4002−(2000.3+2001.5))=FRAC(4002−4001.8)=0.2. Thus, HSYNCCn must begin 0.2 scan periods after HSYNCKn, and imaging for C must begin 4001 scan lines prior to K, resulting in a 4002 scan line separation between images. Again, HSYNCKn is the reference.

For M: FRAC(2001−2000.3)=0.7. Thus, HSYNCMn must begin 0.7 scan periods after HSYNCKn and imaging for M must begin 2000 scans before imaging of K, resulting in a 2001 scan line separation. Again, this is with HSYNCKn as a reference.

Figure 5:
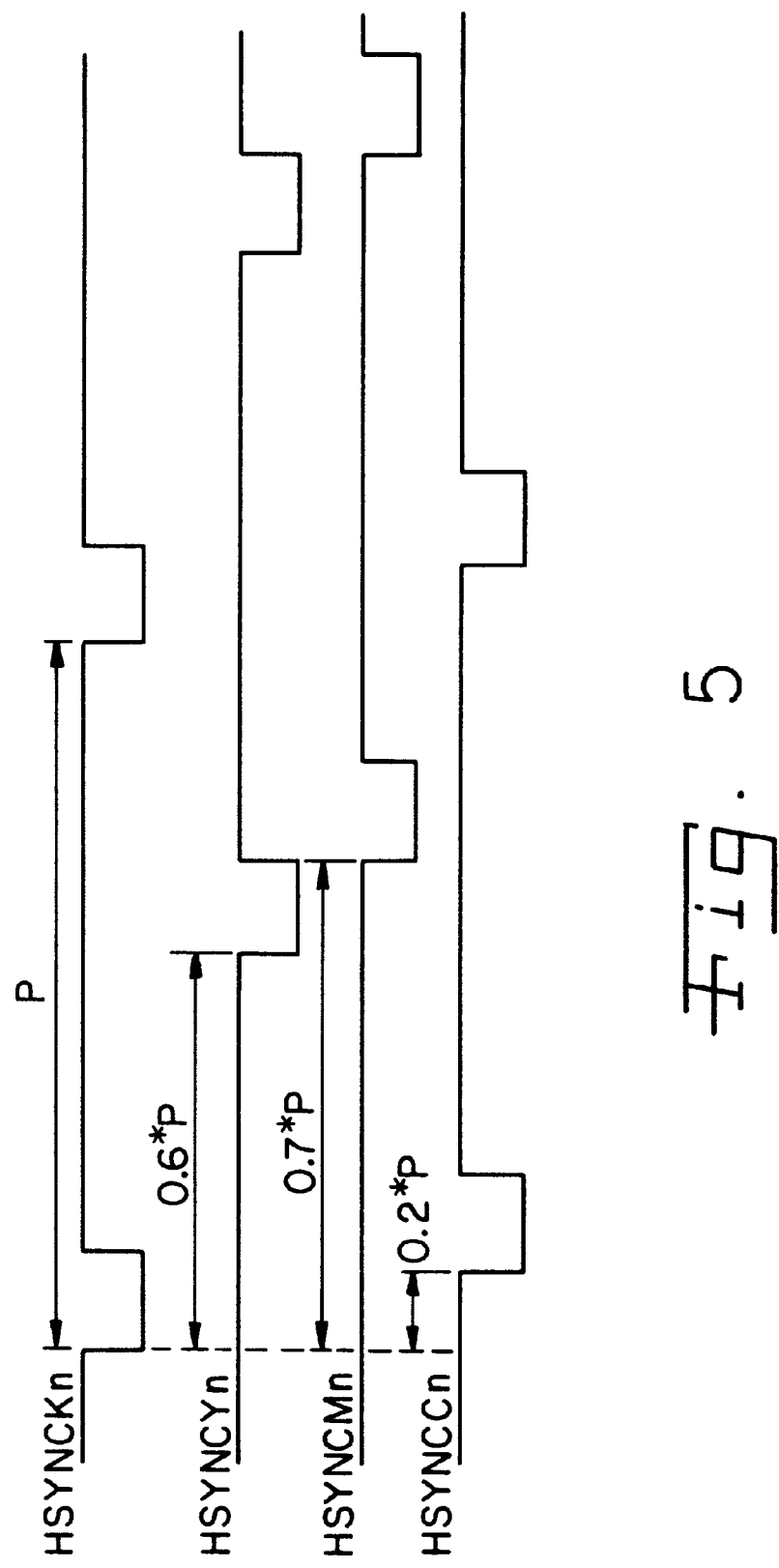
FIG. 5 is a plot of several signals transmitted by the controller of FIG. 1.

The time staggered relationships between the HSYNC signals are shown in FIG. 5. The effect of the time staggering between the HSYNC signals can have the effect of staggering the times at which the corresponding laser beams 38, 40, 42 and 44 start a scan line. A delay in one HSYNC signal relative to another HSYNC signal causes a corresponding delay in the time at which the corresponding laser beam starts a scan line relative to the time at which the other corresponding laser beam starts a scan line.

If, during operation, thermal changes within printer 10 cause the length of toner transfer belt 36 between two photoconductive drums to change such that the respective scan lines produced by the two photoconductive drums are no longer aligned in process direction 54, an adjustment in the time staggering between their respective HSYNC signals can be made in order to bring the scan lines into alignment. This adjustment to the time staggering of the HSYNC signals corresponds to a change in the relative phase of the polygons and is produced by temporarily increasing or decreasing a speed of a corresponding one of polygon mirrors 46, 48, 50 and 52. The magnitude and length of time of the temporary change in speed of rotation depends upon the fractional portion of the change in length of toner transfer belt 36 between the two corresponding photoconductive drums when expressed in terms of scan line separation distance 78.

Figure 6:
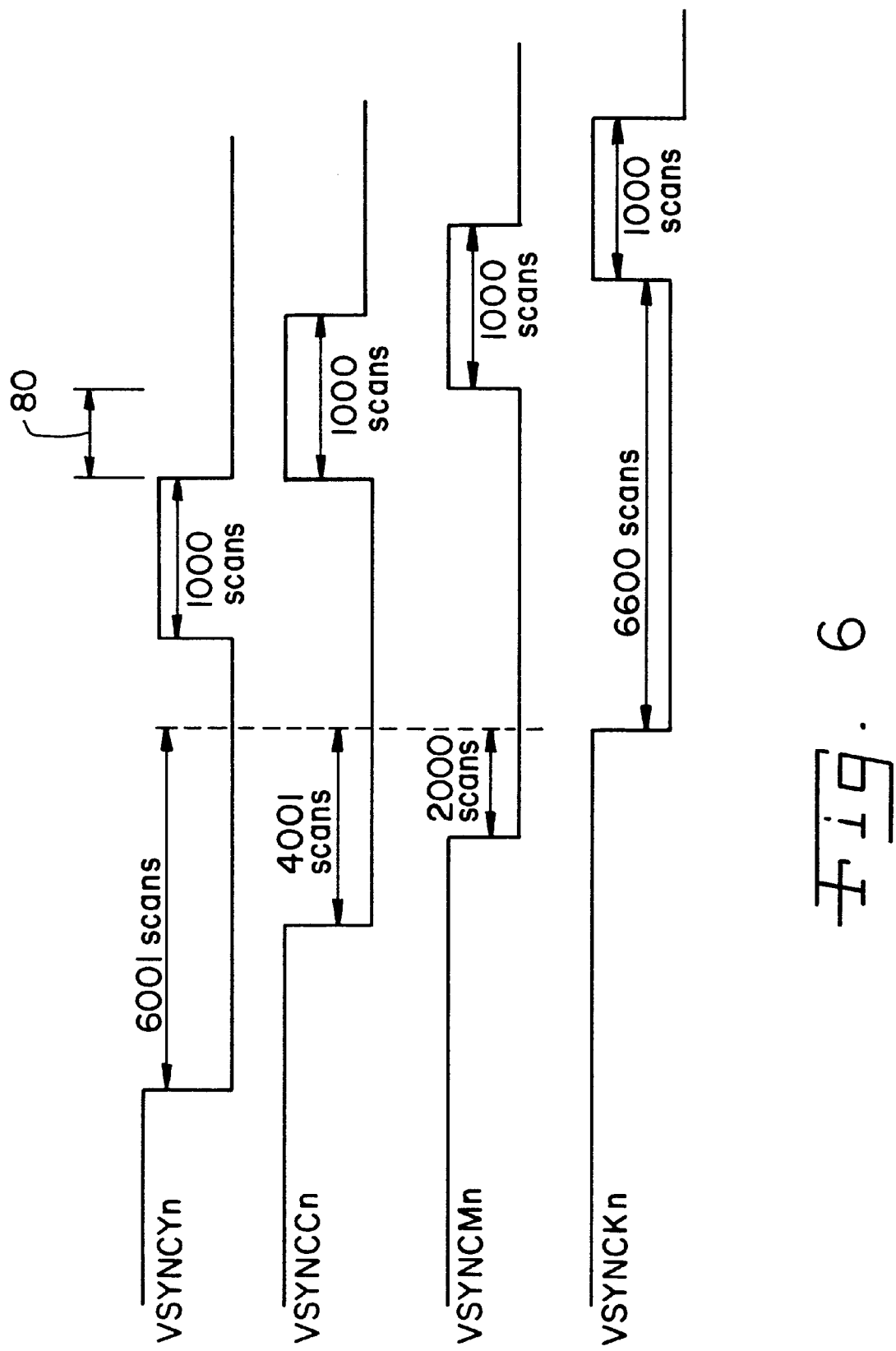
FIG. 6 is a plot of several other signals transmitted by the controller of FIG. 1.

Signals are also needed to describe when rendering of scan lined images should begin in process direction 54 at the beginning of a new page of print medium. Such signals are referred to as vertical synchronization signals (VSYNC), and the time staggered relationships between these signals are shown in FIG. 6. When a corresponding VSYNC signal is active, i.e., goes low on a falling edge, then the raster image processor causes the corresponding laser beam to begin supplying image data corresponding to the first scan line of the image and continuing with subsequent scans to the corresponding photoconductive drum. The VSYNC signals are all synchronized to the HSYNCK signal. FIG. 6 reflects the assumed scan distances discussed above and further assumes an image length of 6,600 scan lines per page and two consecutive images on two consecutive pages. FIG. 6 reflects the ordering of the Y, M, C and K photoconductor drums as shown in FIG. 1. However, it is to be understood that other orderings of the colors are possible. The falling edge of each VSYNC signal is synchronized to the falling edge of the HSYNCK signal.

In FIG. 6, it can be seen that the VSYNCYn signal is active for the second page during interval 80 while the VSYNCCn and VSYNCKn signals are active for the first page during the same interval 80. Thus, imaging of a portion of the second page is concurrent or simultaneous with the imaging of a different portion of the first page. The number of pages imaged simultaneously and the length of the portions of the pages imaged simultaneously are dependent upon the length of toner transfer belt 36 between photoconductor drums, the length of the page to be imaged, and the desired interpage gap.

Figure 7:
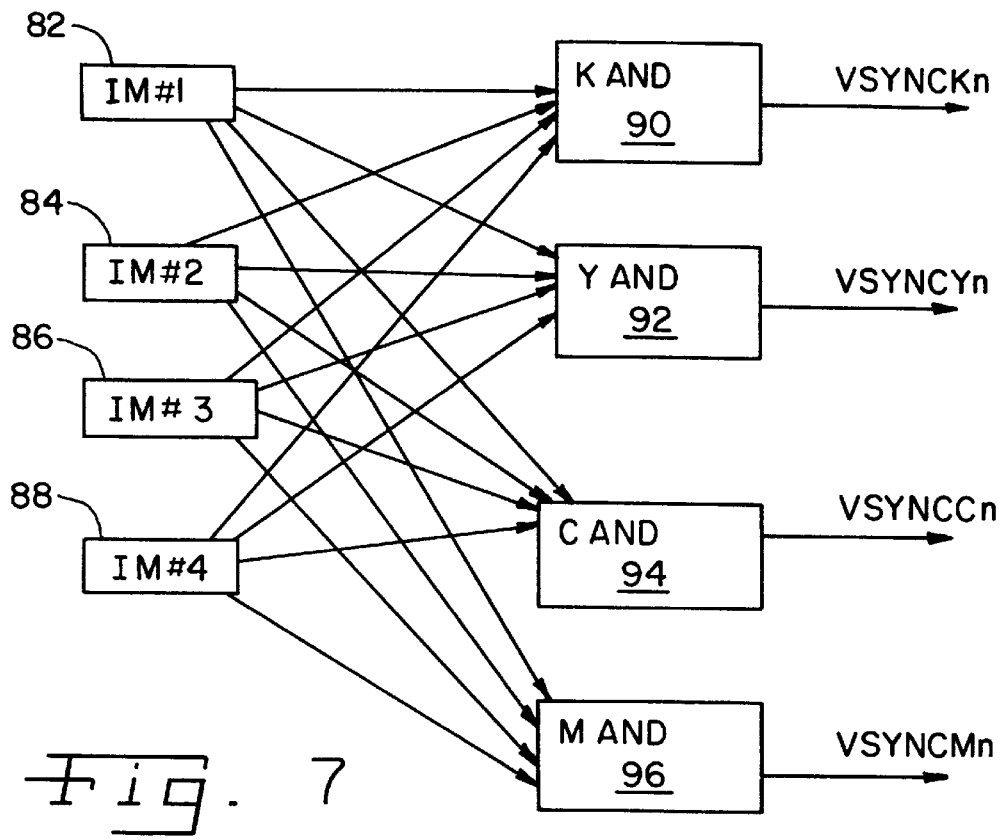
FIG. 7 is a block diagram of the print data flowpath in the printer of FIG. 1.

FIG. 7 illustrates a process which allows different portions of three or even four pages to be printed simultaneously. Each of image managers 82, 84, 86 and 88 generates delay information associated with a particular page. This information includes the delays in the scans from VSYNCYn to VSYNCMn; VSYNCYn to VSYNCCn; VSYNCYn to VSYNCKn; and the length of a page. The length of the delays in each of image managers 82, 84, 86 and 88 are the same because the distances upon which they depend do not change. However, each image manager can have a different page length because the printed pages may be of different sizes. Each of image managers 82, 84, 86 and 88 generates a waveform for VSYNCYn, VSYNCMn, VSYNCCn and VSYNCKn. The outputs of each of image managers 82, 84, 86 and 88 are logically "ANDED" together for each color by respective logic circuits 90, 92, 94 and 96 to form the composite waveforms. Each of image managers 82, 84, 86 and 88 is initialized by a command from the system software executed on controller 37. The initialization of an image manager causes the image manager to generate the waveforms for one page. By staging or staggering the initializations or "GO" commands, it is possible to properly print different portions of pages simultaneously at maximum machine throughput with no process direction registration errors due to the non-integer scan line alignment of photoconductive drums 28, 30, 32 and 34.

Figure 8:
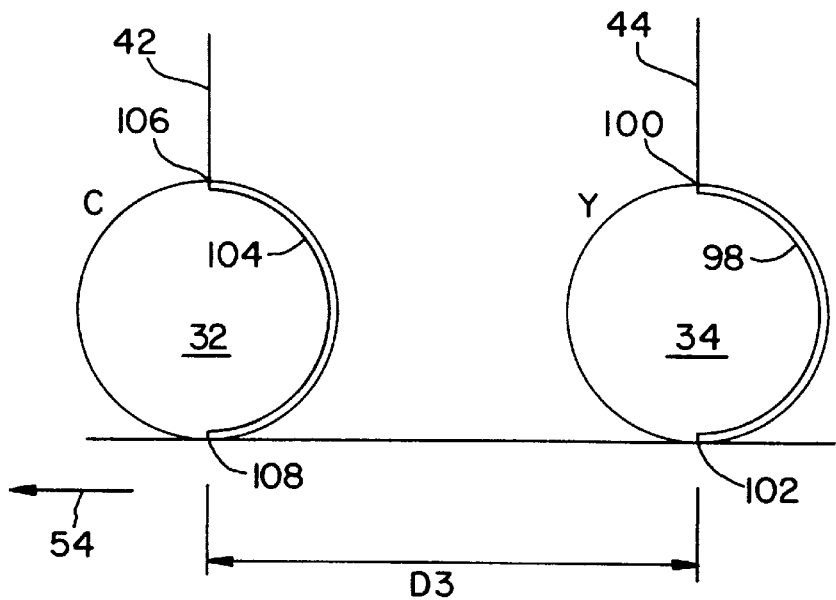
FIG. 8 is an enlarged, fragmentary, schematic side view of the toner transfer belt and two of the photoconductive drums of FIG. 4.

In another embodiment (FIG. 8), a travel distance 98 is defined as a distance along the circumference of photosensitive drum 34 between a point 100 where laser beam 44 impinges upon drum 34 and toner transfer nip 102. Similarly, a travel distance 104 is defined as a distance along the circumference of photosensitive drum 32 between a point 106 where laser beam 42 impinges upon drum 32 and toner transfer nip 108.

In this embodiment, travel distance 98 is not equal to travel distance 104. More particularly, the difference between travel distance 98 and travel distance 104 is a non-integer multiple of scan line separation distance 78. This non-integer difference can also contribute to a misalignment between the toner transferred at nip 102 and the toner transferred at nip 108. Thus, rather than the rotational offset between mirrors 50 and 52 being dependent only upon distance D3 between nips 102 and 108, the rotational offset is also dependent upon travel distances 98 and 104. More particularly, the rotational offset between mirrors 50 and 52 is dependent on a difference between travel distance 104 and a sum of D3 and travel distance 98. That is, if the quantity (D3+travel distance 98−travel distance 104) is a non-integer multiple of scan line separation distance 78, then there must be a rotational offset between mirrors 50 and 52 in order to ensure proper alignment between the toner transferred at nip 102 and the toner transferred at nip 108.

The relative phases of mirrors 50 and 52 are shown to depend upon travel distances 98 and 104 of photoconductive drums 34 and 32, respectively. Similarly, in order to achieve proper alignment of all four colors, the relative phases of mirrors 46 and 48 depend upon the travel distances associated with photoconductive drums 28 and 30.

In the embodiments shown herein, the image from each photoconductor is accumulated onto an intermediate transfer belt with subsequent transfer to paper. However, it is to be understood that the image from each photoconductor could also be accumulated directly onto paper, termed a paper transport system. The present invention is also applicable to drum accumulators which use an intermediate transfer drum with subsequent transfer to paper; and to drum systems in which the print media is transported upon the drum.

The method of the present invention has been described herein as being used in conjunction with a laser printer. However, it is to be understood that the method of the present invention can be used with any type of electrophotographic machine.

While this invention has been described as having a preferred design, the present invention can be further modified within the spirit and scope of this disclosure. This application is therefore intended to cover any variations, uses, or adaptions of the invention using its general principles. Further, this application is intended to cover such departures from the present disclosure as come within know or customary practice in the art to which this invention pertains and which falls within the limits of the appended claims.

What is claimed is:

1. A method of aligning print images of an electrophotographic machine on a print medium, said method comprising the steps of:

providing a plurality of rotating photoconductive drums in the electrophotographic machine;

providing raster scan data with an electrical processor;

producing a plurality of laser beams corresponding to said raster scan data;

reflecting each of said laser beams off of a respective one of a plurality of reflectors, each said reflector rotating relative to said respective laser beam in synchronism with said raster scan data in both a scan direction and a process direction to thereby scan said laser beam across a respective one of said photoconductive drums to produce a scan line in a scan direction;

cyclically repeating said relative rotation between said laser beams and said respective reflectors to thereby produce a plurality of substantially parallel said scan lines on each said photoconductive drum, each said scan line being displaced from an adjacent said scan line by a scan line separation distance in a process direction, said process direction being substantially perpendicular to said scan direction;

applying toner to each said scan line on said photoconductive drums;

providing a moving toner transfer medium contacting each said photoconductive drum at a respective toner transfer nip, a first said toner transfer nip being associated with a first said reflector, a second said toner transfer nip being associated with a second said reflector, a length of said toner transfer medium between at least said first toner transfer nip and said second toner transfer nip being a non-integer multiple of said scan line separation distance, said length of said toner transfer medium having an integer portion and a fractional portion when expressed in units of said scan line separation distance;

one of temporarily increasing and temporarily decreasing a speed of said rotation of said second reflector dependent upon said fractional portion of said length;

transferring said toner from said photoconductive drums to said toner transfer medium; and transferring said toner from said toner transfer medium to the print medium.

2. The method of claim 1, wherein each said laser beam impinges upon a respective first point on said respective reflector at a beginning of each said scan line, each said laser beam impinging upon a respective second point on said respective reflector at an end of each said scan line.

3. The method of claim 2, wherein said step of temporarily increasing and temporarily decreasing said speed of said rotation of said second reflector results in a shift of a time at which an associated said laser beam impinges upon said first point on said second reflector.

4. The method of claim 1, wherein said step of temporarily increasing and temporarily decreasing said speed of said rotation is performed such that each said scan line transferred to said toner transfer medium at said second toner transfer nip is substantially aligned in the process direction with a corresponding said scan line transferred to said toner transfer medium at said first toner transfer nip.

5. The method of claim 1, wherein said length of said toner transfer medium between at least said first toner transfer nip and said second toner transfer nip is greater than a sum of a page length of the print medium in the process direction and a length of a desired gap between consecutive pages of the print medium, said method comprising the further step of reflecting a first said laser beam associated with said first toner transfer nip while simultaneously reflecting a second said laser beam associated with said second toner transfer nip, said reflecting of said second laser beam being dependent upon at least one of the page length of the print medium and the length of the desired gap between consecutive pages of the print medium.

6. The method of claim 5, wherein the sum of a page length of the print medium in the process direction and a length of a desired gap between consecutive pages of the print medium is indicated by consecutive vertical synchronization signals.

7. The method of claim 1, wherein respective axes of said rotating photoconductive drums and said toner transfer nips are substantially parallel with said scan direction.

8. The method of claim 1, wherein at least one of said reflectors comprises a polygon mirror.

9. The method of claim 1, wherein said step of one of temporarily increasing and temporarily decreasing said speed of said rotation is dependent upon a horizontal synchronization signal.

10. A method of aligning print images of an electrophotographic machine on a print medium, said method comprising the steps of:

providing a plurality of rotating photoconductive drums in the electrophotographic machine, each said drum having a substantially equal surface speed;

scanning each of a plurality of laser beams across a respective one of said photoconductive drums to produce a respective one of a plurality of scan lines on each said photoconductive drum;

cyclically repeating said scanning of said laser beams in a plurality of scan cycles to thereby produce a plurality of substantially parallel said scan lines on each said photoconductive drum, a time duration of each said scan cycle being a substantially equal and constant scan cycle time period;

applying toner to each said scan line on said photoconductive drums;

providing a toner transfer medium contacting each said photoconductive drum at a respective toner transfer nip, said toner transfer medium having a surface speed substantially equal to said surface speed of each of said photoconductive drums, an internip travel time in which a point on said toner transfer medium moves between at least a first said toner transfer nip and a second said toner transfer nip being a non-integer multiple of said scan cycle time period, said internip travel time having an integer portion and a fractional portion when expressed in units of said scan cycle time period;

delaying a time at which said laser beam associated with said second toner transfer nip starts a scan line, a time period of said delay being substantially equal to said fractional portion of said scan cycle time period when expressed in units of said scan cycle time period;

transferring said toner from said photoconductive drums to said toner transfer medium; and transferring said toner from said toner transfer medium to the print medium.

11. The method of claim 10, wherein said scanning step includes reflecting each said laser beam off of a respective reflector, each said reflector rotating relative to said respective laser beam to thereby scan said laser beam across a respective one of said photoconductive drums.

12. The method of claim 11, wherein each said laser beam impinges upon a respective first point on said respective reflector at a beginning of each said scan line, each said laser beam impinging upon a respective second point on said respective reflector at an end of each said scan line.

13. The method of claim 12, wherein said delaying step delays a time at which said laser beam associated with said second toner transfer nip impinges upon said first point on said respective reflector.

14. The method of claim 10, wherein each said scan cycle produces a single scan line on each said photoconductive drum.

15. A method of aligning print images of an electrophotographic machine on a print medium, said method comprising the steps of:

providing a plurality of rotating photoconductive drums in the electrophotographic machine, each said drum having a substantially equal surface speed;

scanning each of a plurality of laser beams across a respective one of said photoconductive drums to produce a respective one of a plurality of scan lines on each said photoconductive drum;

cyclically repeating said scanning of said laser beams in a plurality of scan cycles to thereby produce a plurality of substantially parallel said scan lines on each said photoconductive drum, a time duration of each said scan cycle being a substantially equal and constant scan cycle time period;

applying toner to each said scan line on said photoconductive drums;

providing a toner transfer medium contacting each said photoconductive drum at a respective toner transfer nip, said toner transfer medium having a surface speed substantially equal to said surface speed of each of said photoconductive drums, an internip travel time in which a point on said toner transfer medium moves between at least a first said toner transfer nip and a second said toner transfer nip being a non-integer multiple of said scan cycle time period, said internip travel time having an integer portion and a fractional portion when expressed in units of said scan cycle time period;

generating a first signal indicating a plurality of first times at which said laser beam associated with said first toner transfer nip starts a scan line, generating a second signal indicating a plurality of second times at which said laser beam associated with said second toner transfer nip starts a scan line, said second signal being time staggered relative to said first signal such that a difference between each said first time and a corresponding said second time is substantially equal to said fractional portion of said scan cycle time period when expressed in units of said scan cycle time period;

modulating said laser beam associated with said first toner transfer nip during said scanning step and dependent upon said first signal;

modulating said laser beam associated with said second toner transfer nip during said scanning step and dependent upon said second signal;

transferring said toner from said photoconductive drums to said toner transfer medium; and transferring said toner from said toner transfer medium to the print medium.

16. A method of printing on a plurality of pages of print medium with an electrophotographic machine, said method comprising the steps of:

providing a plurality of rotating photoconductive drums in the electrophotographic machine;

providing a moving toner transfer medium contacting each said photoconductive drum at a respective toner transfer nip, a first said toner transfer nip being associated with a first said photoconductive drum, a second said toner transfer nip being associated with a second said photoconductive drum, a length of said toner transfer medium between said first toner transfer nip and said second toner transfer nip being greater than a sum of a page length of the print medium and a desired gap between consecutive ones of the pages of print medium;

cyclically scanning a first laser beam across said first photoconductive drum during a first time period to produce a plurality of first scan lines associated with a first of the pages of print medium;

cyclically scanning a second laser beam across said second photoconductive drum during a second time period to produce a plurality of second scan lines associated with a second of the pages of print medium, said second time period partially overlapping and being time staggered relative to said first time period, said second cyclically scanning step being dependent upon each of:

the page length;

the desired gap between the consecutive pages of print medium;

said length of said toner transfer medium between said first toner transfer nip and said second toner transfer nip; and at least one of a distance between consecutive said first scan lines and consecutive said second scan lines;

applying toner to each of said first scan line and said second scan line on said photoconductive drums;

transferring said toner from said first scan line to a first portion of said toner transfer medium;

transferring said toner from said second scan line to a second portion of said toner transfer medium;

transferring said toner from said first portion of said toner transfer medium to the first of the pages of print medium; and transferring said toner from said second portion of said toner transfer medium to the second of the pages of print medium.

17. The method of claim 16, wherein a plurality of points on each said photoconductive drum are each associated with a top of a respective one of the pages of print medium, said method comprising the further steps of:

providing at least one controller device;

transmitting a plurality of signals to said at least one controller device, said signals being indicative of one of said points on said photoconductive drums being in position to be impinged upon by a respective one of said laser beams; and controlling said scanning of each of said laser beams with said at least one controller device dependent upon said transmitted signals.

18. The method of claim 17, wherein a section of each said photoconductive drum is associated with the gap between consecutive pages of print medium, said signals also being indicative of one of said sections on one of said photoconductive drums being in position to be impinged upon by a respective one of said laser beams, said controlling step also being dependent upon the gap between consecutive pages of print medium.

19. The method of claim 18, wherein said signals comprise vertical synchronization signals.

20. The method of claim 16, comprising the further steps of:

providing a first image manager for controlling a timing of said first cyclical scanning step; and providing a second image manager for controlling a timing of said second cyclical scanning step.

21. A method of providing image registration in an electrophotographic printer having a plurality of multi-faceted mirrors and a corresponding plurality of developing units having a corresponding plurality of toner transfer nips, said method comprising the steps of:

reflecting each of a plurality of laser beams off of a respective one of the mirrors, each said mirror rotating relative to said respective laser beam to thereby scan said laser beam across a respective one of said developing units to produce a scan line in a scan direction;

cyclically repeating said relative rotation between said laser beams and said respective mirrors to thereby produce a plurality of substantially parallel said scan lines on each said developing unit, each said scan line being displaced from an adjacent said scan line by a scan line separation distance in a process direction, said process direction being substantially perpendicular to said scan direction;

providing a moving toner transfer medium contacting each said developing unit at a respective said toner transfer nip, a first said toner transfer nip being associated with a first said mirror, a second said toner transfer nip being associated with a second said mirror, a length of said toner transfer medium between at least said first toner transfer nip and said second toner transfer nip being a non-integer multiple of said scan line separation distance, said length of said toner transfer medium having an integer portion and a fractional portion when expressed in units of said scan line separation distance; and providing a rotational offset of said second mirror relative to said first mirror, said rotational offset being dependent upon said fractional portion of said length of said toner transfer medium when expressed in units of said scan line distance.

22. The method of claim 21, wherein said rotational offset is substantially proportional to said fractional portion.

23. The method of claim 21, wherein said rotational offset comprises a difference in respective rotational positions of said first mirror and said second mirror.

24. The method of claim 21, wherein said rotational offset is maintained substantially throughout said cyclically repeating step.

25. The method of claim 21, wherein said rotation of said first mirror is out of phase with said rotation of said second mirror.

26. The method of claim 21, comprising the further steps of:

providing a plurality of first synchronization signals associated with said rotation of said first mirror; and providing a plurality of second synchronization signals associated with said rotation of said second mirror, said second synchronization signals being time staggered relative to said first synchronization signals.

27. A method of providing image registration in an electrophotographic printer having a plurality of multi-faceted mirrors and a corresponding plurality of developing units having a corresponding plurality of toner transfer nips, said method comprising the steps of:

reflecting a first laser beam off of a first one of the mirrors, said first mirror rotating relative to said first laser beam to thereby scan said first laser beam across a first one of said developing units to produce a first scan line in a scan direction;

cyclically repeating said relative rotation between said first laser beam and said first mirror to thereby produce a plurality of substantially parallel said first scan lines on said first developing unit, each said first scan line being displaced from an adjacent said first scan line by a scan line separation distance in a process direction, said process direction being substantially perpendicular to said scan direction;

reflecting a second laser beam off of a second one of the mirrors, said second mirror rotating relative to said second laser beam to thereby scan said second laser beam across a second one of said developing units to produce a second scan line in the scan direction;

cyclically repeating said relative rotation between said second laser beam and said second mirror to thereby produce a plurality of substantially parallel said second scan lines on said second developing unit, each said second scan line being displaced from an adjacent said second scan line by the scan line separation distance in the process direction;

providing a moving toner transfer medium contacting said first developing unit at a first said toner transfer nip and contacting said second developing unit at a second said toner transfer nip, said first toner transfer nip being disposed before said second transfer nip relative to the process direction, said first developing unit having a first travel distance between a point on said first developing unit where said first laser beam impinges and said first toner transfer nip, said second developing unit having a second travel distance between a point on said second developing unit where said second laser beam impinges and said second toner transfer nip, a difference between said second travel distance and a sum of a length of said toner transfer medium between at least said first toner transfer nip and said second toner transfer nip and said first travel distance being a non-integer multiple of said scan line separation distance, said difference having an integer portion and a fractional portion when expressed in units of said scan line separation distance; and providing a rotational offset of said second mirror relative to said first mirror, said rotational offset being dependent upon said fractional portion of said difference when expressed in units of said scan line distance.

28. The method of claim 27, wherein said rotational offset is substantially proportional to said fractional portion.

29. The method of claim 27, wherein said rotational offset comprises a difference in respective rotational positions of said first mirror and said second mirror.

30. The method of claim 27, wherein said rotational offset is maintained substantially throughout said cyclically repeating steps.

31. The method of claim 27, wherein said rotation of said first mirror is out of phase with said rotation of said second mirror.

32. The method of claim 27, comprising the further steps of:

providing a plurality of first synchronization signals associated with said rotation of said first mirror; and providing a plurality of second synchronization signals associated with said rotation of said second mirror, said second synchronization signals being time staggered relative to said first synchronization signals.

* * * * *